United States Patent [19]

Popowich

[11] 4,075,681

[45] Feb. 21, 1978

[54] CAPACITOR WITH NOBLE METAL ELECTRODES

[75] Inventor: Michael John Popowich, Lewiston, N.Y.

[73] Assignee: E. I. Du Pont de Nemours and Company, Wilmington, Del.

[21] Appl. No.: 640,290

[22] Filed: Dec. 12, 1975

Related U.S. Application Data

[60] Division of Ser. No. 576,176, June 13, 1975, abandoned, which is a continuation-in-part of Ser. No. 406,362, Oct. 15, 1973, abandoned, which is a continuation-in-part of Ser. No. 380,602, July 19, 1973, abandoned.

[51] Int. Cl.$^2$ .............................................. H01G 1/01

[52] U.S. Cl. .................................... 361/305; 252/514; 252/515; 361/321

[58] Field of Search ................ 252/515, 514; 317/258, 317/261; 106/1

[56] References Cited

U.S. PATENT DOCUMENTS

| | | | |
|---|---|---|---|
| 2,437,212 | 3/1948 | Schottland | 317/261 |
| 3,385,799 | 5/1968 | Hoffman | 252/514 |
| 3,394,290 | 7/1968 | Boykin | 317/258 |
| 3,401,126 | 9/1968 | Miller | 252/514 |
| 3,741,780 | 6/1973 | Hoffman | 106/1 |

FOREIGN PATENT DOCUMENTS

| | | | |
|---|---|---|---|
| 981,792 | 1/1965 | United Kingdom | 106/1 |

OTHER PUBLICATIONS

Condensed Chem. Dictionary, Sixth Edition, p. 524, Reinhold, N.Y., 1963.

*Primary Examiner*—E. A. Goldberg

[57] ABSTRACT

A process for making multilayer capacitors using electrode compositions of noble metals dispersed in an inert vehicle, said compositions comprising palladium and certain amounts of additive oxide, the additive oxide being selected from among $ThO_2$, $Gd_2O_3$, BeO, MgO, $ZrO_2$, $Al_2O_3$, $CeO_2$, $Y_2O_3$, $HfO_2$, BaO, and mixtures thereof. Also the resultant capacitors.

6 Claims, 4 Drawing Figures

CAPACITOR WITH NOBLE METAL ELECTRODES

CROSS-REFERENCE TO RELATED APPLICATIONS

This application is a division of my copending application U.S. Ser. No. 576,176, filed June 13, 1975; which is a continuation-in-part of my copending application U.S. Ser. No. 406,362, filed Oct. 15, 1973; which is in turn a continuation-in-part of U.S. Ser. No. 380,602, filed July 19, 1973, each of which is now abandoned.

BACKGROUND OF THE INVENTION

This invention relates to conductors, and, more particularly, to compositions useful for producing electrodes in multilayer capacitors.

Multilayer monolithic capacitors comprise a multiple number of dielectric layers, at least some of which bear metallizations (electrodes) in desired patterns. Such capacitors are made from green (unfired) tape of ceramic particles held together with an organic binder, by cutting pieces of tape from a sheet of tape, metallizing some of the tape pieces, stacking and laminating the pieces of tape, and firing the resultant laminate to drive off any organic binders and vehicles and form a sintered (coherent) body, which is termed "monolithic."

Rodrieguez et al. U.S. Pat. No. 3,456,313 discloses a process for making multilayer capacitors. FIG. 1 of Fabricius U.S. Pat. No. 3,223,905 shows a multilayer capacitor, which may be of alternating palladium and barium titanate layers.

Metallizations useful in producing conductors for multilayer capacitors normally comprise finely divided metal particles, applied to dielectric substrates in the form of a dispersion of such particles in an inert liquid vehicle. Selection of the composition of the metal particles is based on a compromise of cost and performance. Performance normally requires the use of the noble metals, due to their relative inertness during firing on dielectric substrates to produce electrically continuous conductors, since base metals often are oxidized in air at elevated temperatures and/or react with the dielectric substrate during firing.

Also used often as electrodes in multilayer capacitors are the coprecipitated noble metal alloys of Hoffman U.S. Pat. Nos. 3,385,799 and 3,390,981 and Short U.S. Pat. No. 3,620,714.

It is known that the particle size in gross sintered noble metal objects, formed by compacting and sintering noble metal powder compositions, can be controlled. Such control is accomplished by adding to the powder composition, prior to sintering, refractory oxides such as thoria (Smithells U.S. Pat. No. 2,406,172); metals capable of forming non-volatile stable oxides (Streicher U.S. Pat. No. 2,636,819); refractory oxide particles of certain particle sizes such as the 13 oxides mentioned at column 3, lines 26–41 in Alexander et al. U.S. Pat. No. 2,972,529 and the 11 mentioned at column 3, lines 56–67 of Alexander et al. U.S. Pat. No. 3,180,727.

The use of thoria in the formation of gross sintered objects of base metals is disclosed in Gulamiche U.S. Pat. No. 3,515,523, where powders of iron, cobalt and/or nickel are mixed with chromium and thoria, and then agglomerated and sintered in a halogenated atmosphere. None of these references suggests dispersions of metal plus oxide in a printing vehicle, nor makes any reference to thick-film electrodes.

There exists a need for screen-printable compositions useful in forming capacitor electrodes which are less expensive than conventional noble metal systems and which can produce enhanced capacitance in the resultant capacitor, or acceptable capacitance at lower metal loadings in the dispersion. Such enhanced capacitance could result from densification of the fired capacitor electrodes (i.e., a reduction in the "laceyness" often observed in fired thick films of palladium particles). Also desirable are lower dissipation factors.

SUMMARY OF THE INVENTION

In powder compositions based upon finely divided palladium (that is, wherein the noble metal is palladium or a mixture or alloy of at least 40% by weight palladium with one or more noble metals selected from the class consisting of silver, platinum and gold) dispersed in an inert liquid vehicle, said compositions being useful for forming conductors in multilayer capacitors, I have discovered an improvement which often permits increased coverage of such palladium dispersions on the substrate in the printing operation, and can produce higher capacitance in capacitors formed upon heating to sinter or mature the various dielectric and conductor layers. The improvement consists in adding to the compositions about 0.2–14% of a finely divided additive oxide, the weight of additive oxide in the dispersion being based upon the total weight of additive oxide and palladium and other noble metals (if any) in the composition. The additive oxides are one or more of $ThO_2$, $Gd_2O_3$, BeO, MgO, $ZrO_2$, $Al_2O_3$, $CeO_2$, $Y_2O_3$, $HfO_2$, and BaO. Preferred oxides are $ThO_2$ and/or $Gd_2O_3$. When the additive oxide is $ThO_2$, it is preferred that there be 0.2–8% $ThO_2$, the optimum amount being 2–7% $ThO_2$. When the additive oxide is $Gd_2O_3$, the preferred amount of oxide is 0.2–14%, the optimum amount being 8–13%. In these compositions at least 90% of the metal particles and of the additive oxide particles are no greater than 5 microns in diameter.

Capacitors of these improved compositions often exhibit increased capacitance and decreased dissipation factor as compared with additive-free systems.

Preferred noble metals are Pd and Pd/Ag compositions comprising up to about 40% Ag, based on the total weight of Pd and Ag. This may alternately be expressed as 60–100% Pd and 0–40% Ag. Preferred dispersions comprise 25–75% by weight inert vehicle and 25–75% inorganic solids (noble metal plus oxide). The present invention also provides multilayer capacitors of alternating layers of dielectric material and noble metal electrode material, wherein the electrode material is palladium or mixtures or alloys of palladium with silver, platinum and/or gold and 0.2–14% addition oxide, the weight of additive oxide being based upon the total weight of additive oxide and noble metal present. Preferred capacitors are those wherein the dielectric layer comprises barium titanate.

It is surprising that the addition of these additive oxides to palladium-based metallizations would result in the production of the desired densified electrodes, since at least several of such oxides have been used to impede the metal working process, that is, to impede the process of densification in making bulk sintered metal objects. Thus, I have employed oxides, used to impede densification in bulk objects, to enhance densification in thick film electrodes.

BRIEF REFERENCE TO THE DRAWINGS

In the drawings:

FIG. 1 is a cross-sectional view of a monolithic multilayer capacitor of alternate layers of dielectric 10 and staggered electrodes 11, having terminal contact electrodes 12 at each end of the capacitor.

DETAILED DESCRIPTION OF THE INVENTION

Figure 1:
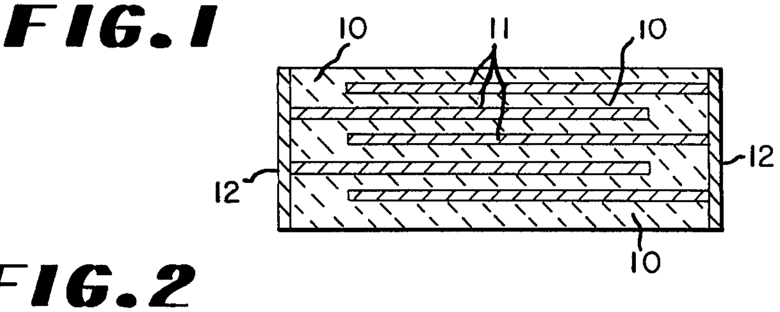

It has been discovered that the addition of small amounts of certain finely divided additive oxides to finely divided Pd-based dispersions may result in fired (sintered) metal films of reduced sheet resistivity, and hence enhance the capacitance of resultant capacitors. For example, capacitors of barium titanate dielectrics made using a 47% Pd/3% $ThO_2$/50% vehicle composition (6% thoria based on solids) can yield 30% higher capacitance than units made with a 50% Pd/50% vehicle composition. Therefore, significant cost savings can be attained since equivalent capacitance can be achieved either by using lower metal concentration electrodes or by making smaller geometry capacitors.

The compositions of the present invention comprise finely divided inorganic powders dispersed in inert vehicles. The powders are sufficiently finely divided to be used in conventional screen or stencil printing operations, and to facilitate sintering. Furthermore, in the production of multilayer capacitors from green ceramic sheets, the presence of coarse particles as part of inner electrode prints would puncture the green dielectric sheets. Generally, the metallizations are such that at least 90% of the noble metal and of the additive oxide particles are no greater than 5 microns in diameter (that is, their largest dimension for irregularly shaped particles). In preferred metallizations substantially all of the oxide particles are less than 1 micron in size, and in more preferred metallizations substantially all of the oxide particles are less than 0.5 micron in size. Yet more preferred oxide particles are those wherein their surface area is at least 5 $m.^2/g.$ or finer, and optimum particles at least 8 $m.^2/g.$ or finer.

The noble metal powder may be palladium, or mixtures or alloys thereof with platinum, gold and/or silver containing at least 40% Pd. The relative amounts of noble metals in the noble metal mixture or alloy is dependent upon the properties desired, and are selected by one skilled in the art depending upon the desired balance of cost and properties. Generally, Pd and Pd/Ag are preferred, there being no more than 40% by weight silver in such preferred Pd/Ag mixtures.

The additive oxide is the essential ingredient in the compositions of the present invention. About 0.2–14% by weight of additive oxide (based on the total weight of noble metal and additive oxide) leads to increased capacitance in the multilayer capacitors. At least 0.2% additive oxide is present to obtain a significant improvement in properties. More than 14% additive oxide reduces capacitance below desirable levels.

It is within the scope of this invention to employ in the (unfired) dispersions of this invention precursors of the claimed additive oxides, which upon heating yield the additive oxide (e.g., gadolinium resinates which decompose to $Gd_2O_3$). The metallizing compositions are prepared from the solids and vehicles by mechanical mixing. The metallizing compositions of the present invention are printed as a film onto ceramic dielectric substrates in the conventional manner. Generally, screen stenciling techniques are preferably employed.

Any inert liquid may be used as the vehicle. Water or any one of various organic liquids, with or without thickening and/or stabilizing agents and/or other common additives, may be used as the vehicle. Generally vehicles comprising organic materials are preferred. Exemplary of the organic liquids which can be used are the aliphatic alcohols; esters of such alcohols, for example, the acetates and propionates; terpenes such as pine oil, terpineol and the like; solutions of resins such as the polymethacrylates of lower alcohols, or solutions of ethyl cellulose, in solvents such as pine oil and the monobutyl ether of ethylene glycol monoacetate. The vehicle may contain or be composed of volatile liquids to promote fast setting after application to the substrate.

The ratio of inert liquid vehicle to solids in the metallizing compositions of this invention may vary considerably and depends upon the manner in which the dispersion of metallizing composition in vehicle is to be applied and the kind of vehicle used. Generally, from 0.2 to 20 parts by weight of solids per part by weight of vehicle will be used to produce a dispersion of the desired consistency. Preferred dispersions contain 25–75% vehicle.

After the electrode composition of the present invention is printed onto green (unfired) dielectric substrate, the resultant metallized dielectrics are cut (diced) as desired, stacked to the desired number of layers, and laminated. The resultant laminate is fired using known techniques to mature (sinter) the metallizing compositions of the present invention and the dielectrics, thereby forming continuous conductors and coherent dielectrics. Although considerable advantage is afforded by the present invention where the compositions are printed on green ceramics and cofired therewith, this invention is not limited to that embodiment. The compositions of the present invention may be printed on prefired (cured) ceramics if so desired.

The dielectric substrate used in the present invention to make multilayer capacitors may be any dielectric compatible with the electrode composition and firing temperature selected, according to principles well established in the art. Such dielectrics include barium titanate, titanium dioxide, alumina, zirconia, barium zirconate, lead zirconate, strontium titanate, calcium titanate, calcium zirconate, lead zirconate, lead zirconate titanate, etc. Barium titanate is preferred herein.

A typical firing cycle for multilayer capacitors comprises two phases. The first, which may last up to several days, is called bisquing. Maximum temperature reached may be anywhere from 600°–1000° F. The purpose is the non-catastrophic removal of organic binder both in the electrodes and the green dielectric sheets. After this is accomplished a rapid (6 hours or less) heat-up to the desired "soaking" temperature for maturing of the dielectric takes place. Soaking temperature depends upon the composition of the dielectric. In general, with barium titanate as the principal dielectric component, soaking temperatures range from about 1180°–1400° C. (2156°–2550° F.). Rate of cooling of the parts after soaking depends upon thermal shock consideration.

EXAMPLES

The following examples and comparative showings are presented to illustrate the advantages of the present invention. In the examples and elsewhere in the specification and claims, all parts, percentages, proportions, etc., are by weight, unless otherwise stated.

Capacitance and dissipation factor were determined as follows. The fired multilayer capacitors were mounted in the jaws of an automatic RLC Bridge (General Radio Model No. 1683) and both capacitance and D.F. were automatically read.

Metal powders used in these experiments were precipitated Pd and Ag powders. The palladium powder was precipitated from palladium chloride solution by dihydrazine sulfate in an ammoniacal solution and had a surface area of about 4 m.$^2$/g. The silver powder was precipitated from silver carbonate by formaldehyde and had a surface area of about 1.3 m.$^2$/g.

The thoria or other additive oxide powder used in these experiments was prepared by milling commercially available oxide powder for 48 hours in a vibratory mill to a surface area in the range 8–20 m.$^2$/g.

The vehicle used in the examples and showings below was a typical screen printing vehicle containing 10 parts Hercules Staybelite rosin, 10 parts ethyl cellulose, 10 parts terpineol, 65 parts kerosene (200°–230° C. fraction) and 10 parts high-flash naphtha.

The capacitance characteristics reported below are expressed relative to the capacitance obtained on the same day under identical test conditions with a control composition of 50% Pd and 50% vehicle. These data are more meaningful than absolute capacitance values, since capacitance can vary from day to day.

EXAMPLES 1–3; COMPARATIVE SHOWINGS A AND B

Examples 1–3 show the use of metallizations of this invention comprising palladium and thoria in the fabrication of multilayer capacitors with three dielectric layers encompassing two buried palladium-thoria layers. The properties of the resultant capacitors are compared with those of capacitors made with palladium electrodes in Showings A and B.

Green (unfired) barium titanate discs 0.5 inch in diameter and about 2 mils thick, having a rated effective K of 1800 at a recommended peak firing temperature of 1400° C., were used as the dielectric.

The metallizing compositions of Examples 1, 2, and 3 were prepared by mixing the proportions of palladium, thoria, and vehicle shown in Table I. Also shown is the percent of thoria based on the total weight of thoria and palladium. Showings A and B, which contain only palladium and vehicle, were prepared for comparison. The mixtures were roll-milled (2 passes at 50 psig) to assure uniformity of the resultant composition.

TABLE I

COMPOSITIONS OF EXAMPLES 1, 2, and 3 AND SHOWINGS A AND B

| | Percent of Total Dispersion | | | |
|---|---|---|---|---|
| | Palladium | Thoria | Vehicle | Percent Thoria Among Solids |
| Example 1 | 37.0 | 3.0 | 60.0 | 7.5 |
| Example 2 | 42.0 | 3.0 | 55.0 | 6.7 |
| Example 3 | 47.0 | 3.0 | 50.0 | 6.0 |
| Showing A | 37.0 | 0 | 63.0 | 0 |
| Showing B | 50.0 | 0 | 50.0 | 0 |

TABLE I-continued

The metallizing compositions were screen printed (325 mesh screen, resultant print about 0.6 mil thick) onto each of two 0.5 inch diameter discs of the unfired dielectric. The printed discs were then notched to give surfaces for subsequent electrical contact, and laminated with a third sheet of dielectric by pressing at 5000 psig for 1 minute at room temperature. Ten capacitors were so prepared for each example or showing.

The pressed parts were placed in a box furnace and the temperature was raised to 500° C. over 16 hours; then raised to 1200° C. over one hour; held at 1200° C. for 1.5 hours; then raised to 1400° C. and held for 1 hour. The resultant capacitors were then moved to a furnace at 1000° C. and allowed to cool slowly to room temperature. The capacitors had the properties set forth in Table II and FIG. 2.

TABLE II

CAPACITANCE AND DISSIPATION FACTOR OF EXAMPLES 1, 2, AND 3 AND SHOWINGS A AND B

| | Relative Capacitance (Cap. Sample/Cap. 50% Pd*) | Dissipation Factor (%) |
|---|---|---|
| Example 1 | 1.11 | 1.5 |
| Example 2 | 1.22 | 1.3 |
| Example 3 | 1.24 | 1.3 |
| Showing A | 0.80 | 1.8 |
| Showing B (Control) | 1.00 | 1.8 |

*50% Pd, 50% Vehicle in Showing B.

Capacitances are reported as the ratio of the capacitance of the sample under test to the capacitance of a 50% palladium composition (Showing B) tested under identical conditions.

Figure 2:
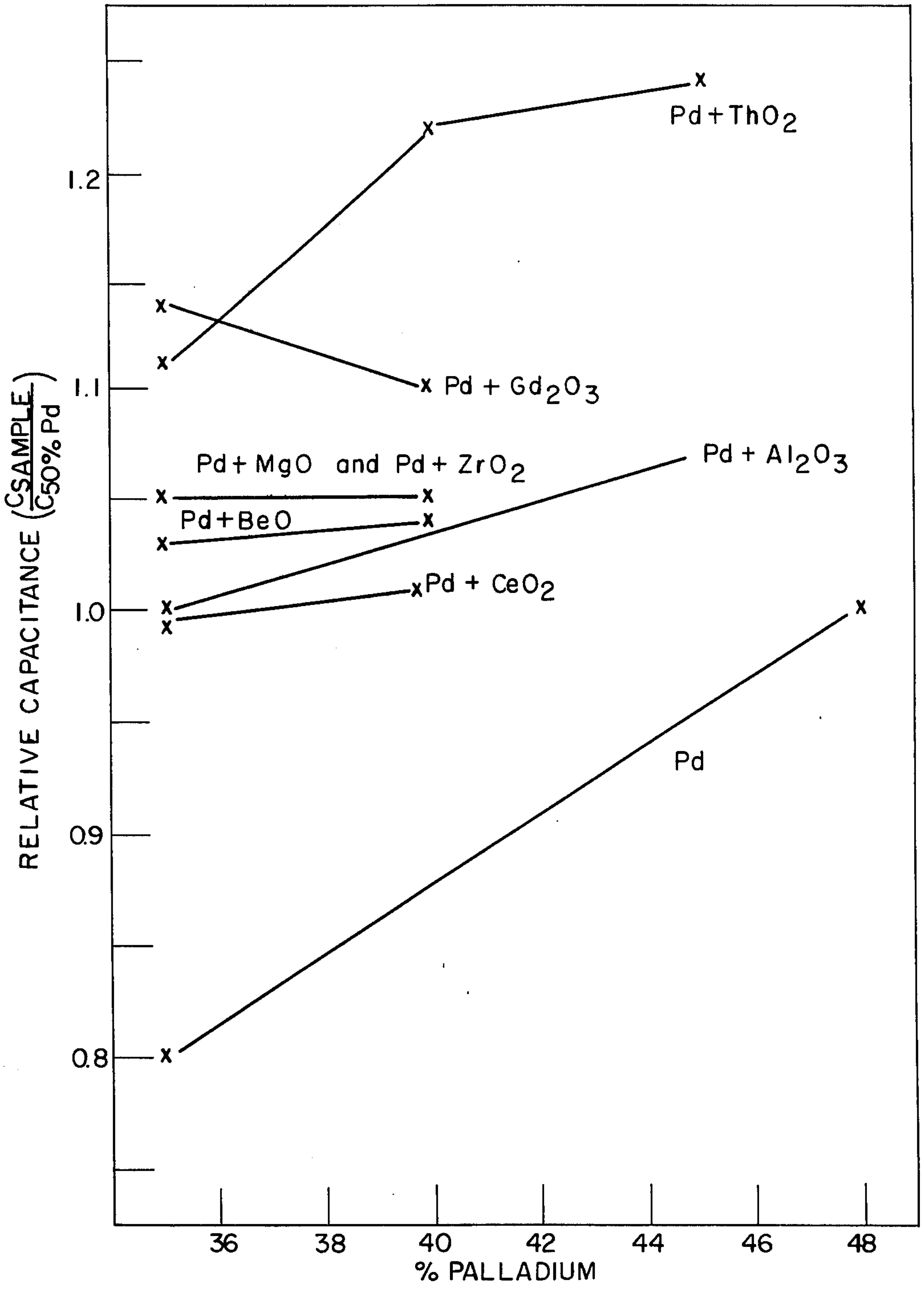
FIG. 2 shows relative capacitance versus palladium content for capacitors of palladium-additive oxide compositions of this invention versus the same with palladium compositions containing no additive oxide.

As shown in FIG. 2, the relative capacitances of the palladium-thoria compositions of Examples 1–3 were about 30% higher than those of palladium compositions of equivalent metal concentration, but containing no thoria. Another beneficial property is that the dissipation factors of the thoria-containing compositions are somewhat lower than those of the straight palladium compositions. These data illustrate that the addition of finely divided thoria to palladium inner electrode compositions can yield fired capacitors of higher capacitance density and lower dissipation factor.

EXAMPLES 4 AND 5, SHOWINGS A AND B

Figure 3:
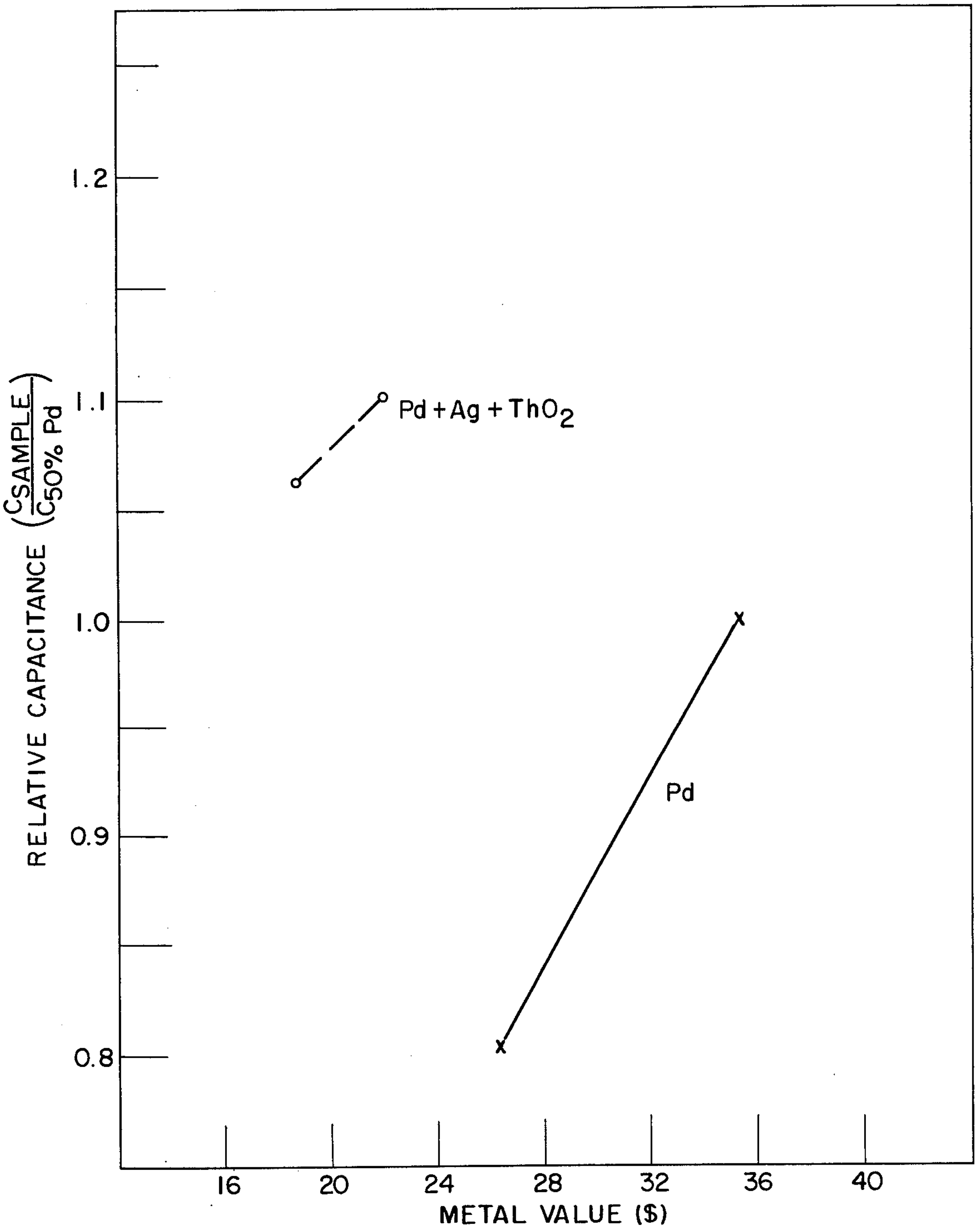
FIG. 3 and FIG. 4 show relative capacitance versus composition cost for various compositions of this invention at various thoria loadings, compared with thoria-free compositions.

Examples 4 and 5 show the use of mtallizations of this invention comprising palladium, silver, and thoria in the fabrication of multilayer capacitors. The properties of the resultant capacitors are compared with those of capacitors made with palladium electrodes (Showings A and B). Sample preparation and testing were the same as described for Examples 1–3. Compositions of these examples and percent thoria based on total weight of Pd, Ag and thoria are given in Table III and capacitance and dissipation factor data are given in Table IV. Due to the present prices for Pd and Ag ($70 per troy ounce for Pd and $2.50 per troy ounce for Ag), some sacrifice in performance is often possible to lower cost by introducing Ag. FIG. 3 illustrates relative capacitance versus metal cost (based on the above cost) for Examples 4 and 5 as compared with Showings A and B.

TABLE III

| COMPOSITION OF EXAMPLES 4 AND 5 | Percent of Total Dispersion | | | | |
|---|---|---|---|---|---|
| | Palladium | Silver | Thoria | Vehicle | Percent Thoria Among Solids |
| Example 4 | 26.0 | 14.0 | 3.0 | 57.0 | 7.0 |
| Example 5 | 30.6 | 16.4 | 3.0 | 50.0 | 6.0 |

TABLE IV

| CAPACITANCE AND DISSIPATION FACTOR OF EXAMPLES 4 AND 5 | Metal Cost ($) | Relative Capacitance (Cap. Sample/Cap. 50% Pd) | Dissipation Factor (%) |
|---|---|---|---|
| Example 4 | 18.55 | 1.06 | 1.2 |
| Example 5 | 21.83 | 1.10 | 1.2 |

These data illustrate the effectiveness of thoria additions in providing low cost Pd/Ag inner electrode compositions which yield higher relative capacitance and lower dissipation.

EXAMPLES 6-11 AND SHOWINGS A AND B

These examples show the use of metallizations of this invention comprising palladium, silver, and varying concentations of thoria in the fabrication of multilayer capacitors. The properties of the resultant capacitors are compared with those of capacitors made with palladium electrodes (Showings A and B). Sample preparation and testing were the same as described for Examples 1, 2, and 3.

Compositions of these examples are given in Table V and data on capacitance and dissipation factor are given in Table VI.

TABLE V

| COMPOSITION OF EXAMPLES 6-11 | Percent of Total Dispersion | | | | |
|---|---|---|---|---|---|
| | Palladium | Silver | Thoria | Vehicle | Percent Thoria Among Solids |
| Example 6 | 25.2 | 16.8 | 3.0 | 55.0 | 6.7 |
| Example 7 | 27.3 | 14.7 | 3.0 | 55.0 | 6.7 |
| Example 8 | 27.3 | 14.7 | 1.0 | 57.0 | 2.3 |
| Example 9 | 30.6 | 16.4 | 1.0 | 52.0 | 2.1 |
| Example 10 | 27.3 | 14.7 | 0.5 | 57.5 | 1.2 |
| Example 11 | 27.3 | 14.7 | 0.1 | 57.9 | 0.24 |

TABLE VI

| CAPACITANCE AND DISSIPATION FACTOR EXAMPLES 6-11 AND SHOWINGS A AND B | Relative Capacitance (Cap. Sample/Cap. 50% Pd) | Dissipation Factor (%) |
|---|---|---|
| Example 6 | 1.00 | 1.2 |
| Example 7 | 1.05 | 1.2 |
| Example 8 | 0.95 | 1.1 |
| Example 9 | 0.96 | 1.1 |
| Example 10 | 0.91 | 1.1 |
| Example 11 | 0.90 | 1.1 |
| Showing A | 0.80 | 1.3 |
| Showing B | 1.00 | 1.2 |

Figure 4:
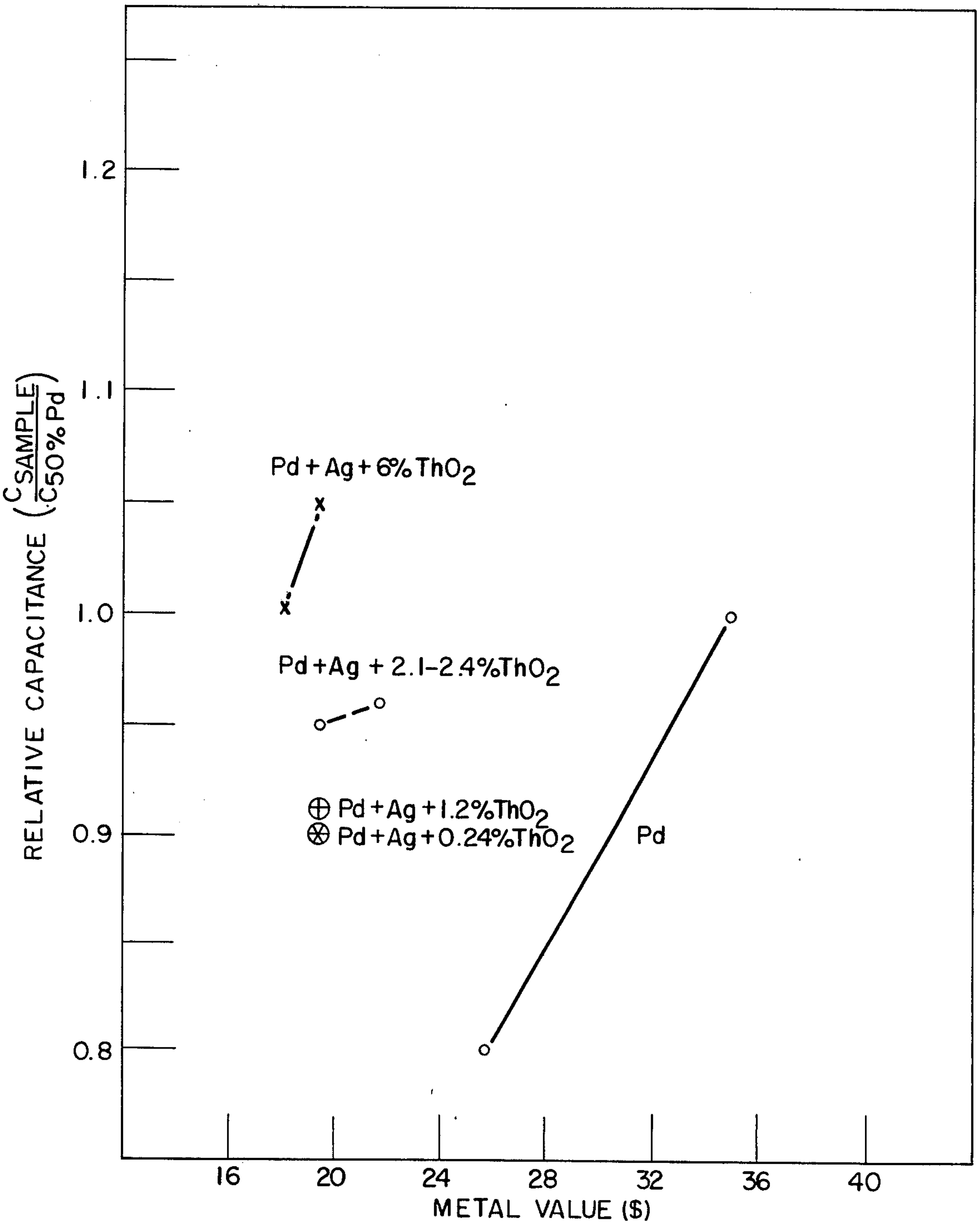

FIG. 4 illustrates the relative capacitance vs. metal cost curves for Examples 6-11 as compared with those of Showings A and B. Thoria additions in the 0.24-6.7 percent range based on total weight of noble metal plus thoria yield significant increases in capacitance, particularly at about 6% thoria. In this connection, it should be noted that Showing B contained 50% Pd and Example 11 only 27.3% Pd, yet even a small amount of thoria produced a good capacitance.

COMPARATIVE SHOWING C

In Examples 6-11, Pd/Ag/thoria compositions were employed. The data there obtained are compared with the data obtained on a Pd/Ag composition. Sample preparation and testing were as described in Examples 1-3.

A dispersion was prepared from 28.0% Pd, 12.0% Ag and 60.0% vehicle. The metal value was $19.90. The relative capacitance was 0.8; the dissipation factor was 1.4%.

Thus, comparison of Showing C (Pd/Ag) and Example 11 (Pd/Ag with only 0.24% thoria) shows a 12.5% increase in capacitance, based on respective relative capacitances of 0.80 and 0.90.

COMPARATIVE SHOWINGS D-I

The special usefulness of thoria in capacitors having palladium and palladium/silver electrodes having at least 40% palladium (by weight) is seen from the following experiments using 10/20/70 platinum/palladium/gold electrodes, wherein thoria additions produced no advantage. Sample preparation and testing were as described in Examples 1-3, except that the barium titanate dielectric contained small amounts of bismuth modifier and hence had a recommended peak firing temperature of 1200° C. rather than 1400° C; the rated effective K was the same (1800). Thus, the firing schedule was as used in Examples 1-3, except the final hour at 1400° C. was eliminated.

The electrode compositions of Showings D-G, which contain a 10/20/70 Pt/Pd/Au alloy and $ThO_2$, and Showings H and I, which contain only the Pt/Pd/Au alloy, as their solid components, are set forth in Table VII. The Pt/Pd/Au alloy used in these experiments was prepared by coprecipitation of Pt, Pd, and Au.

TABLE VII

| COMPOSITION OF SHOWINGS D-I Comparative Showing | Percent of Total Dispersion Pt/Pd/Au Alloy | $ThO_2$ | Vehicle | Percent Thoria Among Solids |
|---|---|---|---|---|
| D | 50.0 | 3.0 | 47.0 | 5.7 |
| E | 45.0 | 3.0 | 52.0 | 6.2 |
| F | 50.0 | 1.0 | 49.0 | 2.0 |
| G | 45.0 | 1.0 | 54.0 | 2.2 |
| H | 50.0 | — | 50.0 | — |
| I | 45.0 | — | 55.0 | — |

The capacitance and dissipation factor of capacitors made using these inner electrode compositions are given in Table VIII.

TABLE VIII

| CAPACITANCE AND DISSIPATION FACTOR OF SHOWINGS D-I Comparative Showing | Relative Capacitance (Cap. Sample/Cap. 50% Pt/Pd/Au) | Dissipation Factor (%) |
|---|---|---|
| D | 0.85 | 3.7 |
| E | 0.07 | — |
| F | 0.47 | 3.3 |
| G | 0.47 | 4.4 |
| H | 1.00 | 3.8 |
| I | 0.98 | 4.1 |

These data illustrate that thoria additions have no significant beneficial effect on electrode compositions containing 10/20/70 Pt/Pd/Au alloys, as compared with the beneficial effect illustrated above with Pd/and Pd/Ag electrodes.

COMPARATIVE SHOWINGS J AND K

A capacitor was prepared using a Pt/Pd/Au/Ag electrode, without thoria and with about 2% thoria; no significant beneficial effect was observed due to the use of thoria, again illustrating the special usefulness of thoria additions to Pd and Pd/Ag electrode compositions.

Capacitors of three dielectric layers and two electrode layers were prepared using the dielectric of Showings D–I and techniques similar to those of Examples 1–3, except that the peak temperature of 1200° C. was held for 2 hours. The metallization paste of Showing J contained 36% of an alloy of 75 Au/25 Pd, 4% Pt, 10% Ag and 50% vehicle. In Showing K, 1% thoria was added (about 2% thoria based on solids). The capacitance in Showing J was 1515 pF. and in Showing K was 1524 pF.

EXAMPLES 12–23

These examples illustrate the use of metallizations of the present invention comprising palladium and additive oxides other than thoria in the fabrication of multilayer capacitors with three dielectric layers encompassing two buried electrodes. The experimental procedures were as in Examples 1–3. Table IX sets forth the composition of the electrode materials used in Examples 12–23.

Table IX also sets forth the relative capacitance (capacitance of the sample divided by capacitance of a sample made using a dispersion of 50% palladium and 50% vehicle), as well as the resultant dissipation factor.

EXAMPLE 24

Capacitors made as in Examples 1–3 using, as the additive oxide, $Y_2O_3$, $HfO_2$, and/or BaO will produce capacitors of similarly improved properties.

TABLE IX

COMPOSITIONS OF EXAMPLES 12–23

| Ex. No. | Dispersion Composition | Percent Additive Oxide Among Solids | Relative Capacitance | Dissipation Factor (%) |
|---|---|---|---|---|
| 12 | 37% Pd, 0.3% BeO, 62.7% Vehicle | 0.8 | 1.03 | 1.7 |
| 13 | 42% Pd, 0.3% BeO, 57.7% Vehicle | 0.7 | 1.04 | 1.7 |
| 14 | 37% Pd, 0.5% MgO, 62.5% Vehicle | 1.3 | 1.05 | 1.9 |
| 15 | 42% Pd, 0.5% MgO, 57.5% Vehicle | 1.2 | 1.05 | 1.7 |
| 16 | 37% Pd, 1.4% $ZrO_2$, 61.6% Vehicle | 3.6 | 1.05 | 1.8 |
| 17 | 42% Pd, 1.4% $ZrO_2$, 56.6% Vehicle | 3.2 | 1.05 | 1.8 |
| 18 | 37% Pd, 3% $Al_2O_3$, 60% Vehicle | 7.5 | 1.00 | 1.6 |
| 19 | 47% Pd, 3% $Al_2O_3$, 50% Vehicle | 6.0 | 1.07 | 1.8 |
| 20 | 37% Pd, 5.5% $Gd_2O_3$, 57.5% Vehicle | 12.9 | 1.14 | 1.7 |
| 21 | 42% Pd, 5.5% $Gd_2O_3$, 52.5% Vehicle | 11.6 | 1.10 | 1.7 |
| 22 | 37% Pd, 2.0% $CeO_2$, 61% Vehicle | 5.1 | 0.99 | 1.8 |
| 23 | 42% Pd, 2.0% $CeO_2$, 56% Vehicle | 4.5 | 1.01 | 1.6 |

I claim:

1. A multilayer capacitor of alternating layers of dielectric material and noble metal electrode material, wherein the electrode material is palladium or mixtures or alloys of at least 40% by weight palladium with one or more other noble metals selected from the class consisting of platinum, silver, and gold, plus about 0.2–14%, by weight, additive oxide, based on the total weight of additive oxide and noble metal present, wherein the additive oxide is one or more of $ThO_2$ and $Gd_2O_3$.

2. A mulilayer capacitor according to claim 1 wherein the additive oxide is $ThO_2$.

3. A multilayer capacitor according to claim 1 wherein the additive oxide is $Gd_2O_3$.

4. A multilayer capacitor according to claim 2 comprising as the additive oxide 0.2–8% $ThO_2$.

5. A multilayer capacitor according to claim 1 wherein the noble metal is Pd or Pd/Ag containing up to 40% Ag, based on the total weight of Pd and Ag.

6. A multilayer capacitor according to claim 3 comprising as the additive oxide 0.2–14% $Gd_2O_3$.

* * * * *